United States Patent [19]

Buxbaum et al.

[11] 4,156,774

[45] May 29, 1979

[54] THERMOPLASTIC COPOLYESTERS, PROCESSES FOR THEIR PREPARATION AND THEIR USE

[75] Inventors: Lothar Buxbaum, Lindenfels, Fed. Rep. of Germany; Rolf Hügi, Ramlinsburg, Switzerland

[73] Assignee: Ciba-Geigy Corporation, Ardsley, N.Y.

[21] Appl. No.: 922,009

[22] Filed: Jul. 3, 1978

[30] Foreign Application Priority Data

Jul. 7, 1977 [CH] Switzerland ..................... 8427/77

[51] Int. Cl.² ..................... C08G 63/46; C08G 63/76
[52] U.S. Cl. ..................... 528/273; 260/860; 528/176; 528/300; 528/301; 528/302; 528/308; 528/309
[58] Field of Search ............... 528/273, 300, 301, 302, 528/308, 309, 176; 260/860

[56] References Cited

U.S. PATENT DOCUMENTS

| | | | |
|---|---|---|---|
| 3,682,863 | 8/1972 | McHale | 528/308 X |
| 3,763,109 | 10/1973 | Witsiepe | 528/308 X |
| 3,932,326 | 1/1976 | Hoit et al. | 528/308 X |
| 4,012,363 | 3/1977 | Brüning et al. | 528/308 |
| 4,062,907 | 12/1977 | Sublett | 528/301 X |

*Primary Examiner*—Lucille M. Phynes
*Attorney, Agent, or Firm*—Luther A. R. Hall

[57] ABSTRACT

Thermoplastic copolyesters which have a minimum relative viscosity of 1.4 and contain, based on the polyester, (a) 40–50 mol % of units of terephthalic acid, (b) 0–10 mol % of units of aliphatic, cycloaliphatic or other aromatic dicarboxylic acids, (c) 15–30 mol % of units of ethylene glycol, (d) 34.5–15 mol % of units of diethylene glycol and (e) 0.5–5 mol % of units of polybutylene glycol with a molecular weight of 650 or the same amount by weight with a molecular weight of between 400 and 4,000, it being possible for up to 10 mol % of the units of ethylene glycol and/or diethylene glycol to be replaced by units of alkylenediols having 3 to 10 C atoms and/or units of a bisphenol dihydroxyalkyl ether, are outstandingly suitable as hot-melt adhesives.

11 Claims, No Drawings

THERMOPLASTIC COPOLYESTERS, PROCESSES FOR THEIR PREPARATION AND THEIR USE

The present invention relates to thermoplastic copolyesters of terephthalic acid and, if desired, further dicarboxylic acids and a mixture of aliphatic diols, processes for their preparation and their use.

Hot-melt adhesives based on saturated polyesters have already been known for a relatively long time. The diols used are in the main ethylene glycol or 1,4-butanediol and the dicarboxylic acids used are in the main aromatic dicarboxylic acids, especially terephthalic acid and/or isophthalic acid. Depending on the composition of the polyesters, the spectrum of properties thereof does not include a field of application as hot-melt adhesives or includes a broad or specific field of application as hot-melt adhesives.

It is therefore desirable to provide special polyesters which, by virtue of a specific characteristic, are especially suitable for some applications.

The object of the present invention is to provide amorphous polyester hot-melt adhesives which impart good peel strength with an otherwise balanced spectrum of properties and, at the same time, good stability of the adhesive bonds.

The present invention relates to a thermoplastic copolyester which has a minimum relative viscosity of 1.4 and preferably 2.0, measured at 30° C. on solutions of 1 g of polyester in 100 ml of a solvent consisting of equal parts of phenol and symmetrical tetrachloroethane, and contains condensed units of at least one aromatic dicarboxylic acid and also of a mixture of aliphatic diols and which contains, based on the polyester, (a) 40–50 mol % of units of terephthalic acid, (b) 0–10 mol % of units of aliphatic, cycloaliphatic or other aromatic dicarboxylic acids, (c) 15–30, preferably 20–30, mol % of units of ethylene glycol, (d) 34.5–15, preferably 28–15, mol % of units of diethylene glycol and (e) 0.5–5, preferably 2–5, mol % of units of polybutylene glycol with a molecular weight of 650 or the same amount by weight with a molecular weight of between 400 and 4,000, it being possible for up to 10 mol % of the units of ethylene glycol and/or diethylene glycol to be replaced by units of alkylenediols having 3 to 10 C atoms and/or units of a bisphenol dihydroxyalkyl ether.

The minimum relative viscosity is preferably 2.4 and the maximum relative viscosity 5.0 and especially 4.0.

The copolyester according to the invention preferably contains at least 45 mol % of units of terephthalic acid and preferentially contains only units of terephthalic acid, that is to say 50 mol %. If other dicarboxylic acids are present, these can be, for example, those which follow:

Suitable dicarboxylic acids are linear and branched saturated aliphatic dicarboxylic acids, aromatic dicarboxylic acids and cycloaliphatic dicarboxylic acids.

Aliphatic dicarboxylic acids are those having 4–36 C atoms, for example oxalic acid, malonic acid, dimethylmalonic acid, succinic acid, octadecylsuccinic acid, pimelic acid, adipic acid, trimethyladipic acid, sebacic acid, azelaic acid and dimeric acids (dimerisation products of unsaturated aliphatic carboxylic acids such as oleic acid) and also alkylated malonic and succinic acids, such as octadecylsuccinic acid.

Cycloaliphatic dicarboxylic acids, which preferably contain 6 to 12 C atoms, are: 1,3-cyclobutanedicarboxylic acid 1,3-cyclopentanedicarboxylic acid, 1,3-and 1,4-cyclohexanedicarboxylic acid, 1,3- and 1,4-dicarboxymethylcyclohexane and 4,4'-dicyclohexyldicarboxylic acid.

Suitable aromatic dicarboxylic acids, especially those having 8–14 C atoms, are: in particular terephthalic acid, isophthalic acid and o-phthalic acid and also 1,3-, 1,4-, 2,6- or 2,7-naphthalenedicarboxylic acid, 4,4'-diphenyldicarboxylic acid, 4,4'-diphenylsulphonedicarboxylic acid, 1,1,3-trimethyl-5-carboxyl-3-(p-carboxyphenyl)-indane, 4,4'-diphenyl ether-dicarboxylic acid and bis-p-(carboxyphenyl)-methane.

Further suitable dicarboxylic acids are those which contain —CO—NH— groups; they are described in German Offenlegungsschrift No. 2,414,349. Dicarboxylic acids which contain N-heterocyclic rings are also suitable, for example those which are derived from carboxyalkylated, carboxyphenylated or carboxybenzylated monoamino-s-triazinedicarboxylic acids (cf. German Offenlegungsschriften Nos. 2,121,184 and 2,533,675), mono- or bis-hydantoins, benzimidazolones, which can be halogenated, or parabanic acid. In these acids the carboxyalkyl group can contain 3 to 20 C atoms.

The copolyester according to the invention can also contain other diols, but preferably not more than 5 mol % of the units of ethylene glycol and/or diethylene glycol are replaced.

Suitable alkylenediols are the linear and branched aliphatic glycols, especially those having 3–6 carbon atoms in the molecule, for example: 1,2-, or 1,3-propylene glycol, 1,2-, 1,3-, 2,3- or 1,4-butanediol, pentylglycol, neopentylglycol, 1,6-hexanediol and 1,12-decanediol.

The other diol can also be a bisphenol dihydroxyalkyl ether. This bisphenol derivative preferably has the formula

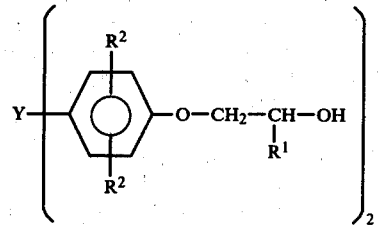

in which $R^1$ is a hydrogen atom, methyl or ethyl, $R^2$ is a hydrogen, chlorine or bromine atom or methyl and Y is substituted or unsubstituted alkylene or alkylidene, cycloalkylidene, a direct bond, $O$, $S$ or $SO_2$.

$R^1$ in this formula is preferably methyl and especially a hydrogen atom and $R^2$, furthermore, is preferably bonded in the two ortho positions relative to the oxygen atom. In particular $R^2$ is a hydrogen atom.

Examples of substituted or unsubstituted alkylene are: methylene, ethylene, phenylmethylene, diphenylmethylene and methylphenylmethylene.

Examples of substituted or unsubstituted alkylidene are: ethylidene, 1,1- or 2,2-propylidene, butylidene and 1,1-dichloro- or 1,1,1-trichloro-ethylidene.

Examples of cycloalkylidene are: cyclopentylidene, cyclohexylidene, cycloheptylidene and cyclooctylidene.

The bisphenol derivatives are obtained by reacting corresponding bisphenols with ethylene oxide, propylene oxide or butylene oxide.

Examples of bisphenols are: bis-(p-hydroxyphenyl) ether or thioether, bis-(p-hydroxyphenyl)-sulphone, bis-(p-hydroxyphenyl)-methane, 1,2-bis-(p-hydroxyphenyl)-ethane, phenyl-bis-(p-hydroxyphenyl)-methane, diphenyl-bis-(p-hydroxyphenyl)-methane, 2,2-bis-(4'-hydroxy-3'-methylphenyl)-propane, 2,2-bis-(4'-hydroxy-3',5'-dimethylphenyl)-propane, 2,2-bis-(4'-hydroxy-3'-chlorophenyl)-propane, 2,2-bis-(4'-hydroxy-3',5'-dichlorophenyl)-propane, 2,2-bis-(4'-hydroxy-3',5'-dibromophenyl)-propane, 1,1- or 2,2-bis-(p-hydroxyphenyl)-butane, 1,1-dichloro- or 1,1,1-trichloro-2,2-bis-(p-hydroxyphenyl)-ethane, 1,1-bis-(p-hydroxyphenyl)-cyclopentane and especially 2,2-bis-(p-hydroxyphenyl)-propane (bisphenol A) and 1,1-bis-(p-hydroxyphenyl)-cyclohexane (bisphenol C).

A particularly preferred diol from this group is 2,2-bis-[4'-(β-hydroxyethyl)-phenyl]-propane. 1,1-Bis-[4'-(β-hydroxyethyl)-phenyl]-cyclohexane is also preferred.

The copolyesters preferably contain (c) 25–28 mol % of units of ethylene glycol, (d) 22–19 mol % of units of diethylene glycol and (e) 3 mol % of units of polybutylene glycol with a molecular weight of 650 or the same amount by weight with a molecular weight between 400 and 4,000.

A proportion, that is to say 0.025–0.25 and preferably 0.05–0.15 mol %, of the butanediol and/or of the dicarboxylic acids can be replaced by at least trifunctional compounds containing ester-forming functional groups. Ester-forming functional groups are, for example, hydroxyl and carboxyl groups. Examples of such compounds are: glycerol, trimethylolethane, pentaerythritol or trimellitic acid.

The copolyesters according to the invention can be prepared by known processes, by catalytically condensing the dicarboxylic acids or their polyester-forming derivatives together with the diols. In general, the process conditions are chosen so that polyesters are obtained which have a statistical distribution of the monomers. However, it is also possible to follow a procedure such that block polyesters are obtained, by, for example, subjecting precondensates of the homopolyesters (for example polyethylene terephthalate and polydiethylene glycol terephthalate) in appropriate quantity ratios to a polycondensation reaction, specifically on their own or together with a polyester of terephthalic acid and polybutylene glycol.

Acid-forming derivatives are understood as meaning, for example, the dicarboxylic acid dihalides, preferably the chlorides, and the dicarboxylic acid esters, for example the lower alkyl esters and phenyl esters.

Known embodiments of the process are, for example, solution or azeotropic condensation, interfacial condensation, melt condensation or solid phase condensation and also combinations of these methods. More detailed methods are described, for example, in German Offenlegungsschrift No. 2,453,450. The process is generally carried out at temperatures of 50°–300° C., under normal pressure, in vacuo and/or in a stream of inert gas, depending on which monomers are employed.

The polyesters according to the invention are amorphous or difficult to crystallise, with melting ranges above about 150° C and low glass transition temperatures. They are outstandingly suitable as hot-melt adhesives for substrates of diverse types, such as wood, metal, glass, ceramics and plastics, for example in furniture manufacture, in automobile construction, in the manufacture of tin cans, for fixing decorative elements on articles of jewellery, in the electrical or textile industries and also in foundries when sticking sand moulds and in the packaging industry and bookbinding.

Depending on the fields of application, different processing techniques will be used, for example roller application or nozzle application methods (spreading or spraying) above the fusion temperature. It is also possible to apply solutions of the polyesters in suitable solvents to the substrate surfaces and, during or after evaporation of the solvent, such as methylene chloride, to effect bonding at a temperature above the fusion temperature of the polyester. Furthermore, it is also possible first to produce films or filaments from the copolyesters according to the invention and to use these films to coat the substrate surfaces intended to be bonded. Bonding itself is completed by exerting pressure and applying heat.

The polyesters according to the invention can also contain customary additives, for example waxes and plasticisers, for example long-chain aliphatic compounds (fatty alcohols). They can also be used as a mixture with other polymers, for bonding, and in this case the content of copolyester is usually at least 10% by weight, for example 10 to 90% by weight, based on the total composition. Polymers suitable for admixing are, for example, epoxy resins, nitrocellulose, vinyl chloride/vinyl acetate copolymers, isocyanate resins, triazineformaldehyde resins and polyketones.

The copolyesters according to the invention have a balanced spectrum of properties which ensures that they can be used for diverse applications. They impart excellent adhesion, in particular surprisingly high peel strength, and this also ensures that they can be used for specific applications. At the same time, despite the high content of ether bonds, the copolyesters surprisingly have a high resistance to ageing and resistance to tropical conditions. The water resistance is also outstanding, as are the low-temperature characteristics of the laminates with these hot-melt adhesives.

The polyesters prepared in accordance with the following examples are characterised in more detail by the following measured properties. The polyesters are characterised by those morphological changes which are measured by means of differential thermoanalysis on a sample which has been heat-treated for 3 minutes at a temperature 30° C. above the melting point or softening point and then rapidly chilled. The chilled sample is heated by means of the Perkin-Elmer "DSC-1B" Differential Scanning Calorimeter at a heating rate of 16° C./minute.

The thermogram of the sample shows the glass transition temperature ($T_g$), the crystallisation temperature ($T_c$) and the fusion temperature ($T_f$). The inflection point at the sudden increase in the specific heat in the thermogram is given as the glass transition temperature, the apex of the exothermic peak is given as the crystallisation temperature and the apex of the endothermic peak is given as the fusion temperature. The relative viscosity of the polycondensation products of the examples is determined at 30° C. on solutions of 1 g of polyester in 100 ml of a mixture consisting of equal parts of phenol and tetrachloroethane. The softening temperature is determined on a Kofler heated stage microscope at a heating rate of 15° C./minute, a cross being formed from 2 filaments and the softening temperature being designated as that temperature at which the sharp angles of the cross disappear.

The following test methods are used to characterise the adhesive properties.

(a) The tensile shear strength is determined in accordance with DIN 53,283.

(b) The heat resistance is defined as the temperature at which the tensile shear strength according to DIN 53,283 falls to a value of 6 N/mm$^2$.

(c) The residual tensile shear strength after cold water storage is determined by the tensile shear strength after the samples for measurement have been stored for a certain period in water at 23° C.

(d) The resistance to tropical conditions is obtained by measuring the tensile shear strength after storing the samples in tropical climatic conditions (42° C. and relative atmospheric humidity of 92%). The storage time is indicated.

(e) The resistance to ageing is obtained by measuring the tensile shear strength of the samples after storing at 40° C., 80° C. and 120° C. for a specific period.

(f) The peel strength is determined in accordance with Standard Method DTD 5,577.

EXAMPLE 3,000 g of dimethyl terephthalate (DMT), 2,103 g of ethylene glycol, 1,000 g of diethylene glycol, 619 g of polybutylene glycol with a molecular weight of 650 and also 2.02 g of zinc acetate dihydrate and 2.16 g of antimony trioxide are filled into a 10 l reactor provided with a stirrer, a nitrogen inlet, a separating column and a temperature measuring device, and the mixture is heated to 140° C. 98% of the amount of methanol theoretically to be expected is distilled off in the course of 2.5 hours, with stirring and whilst passing nitrogen into the mixture, and during this time the temperature of the reaction mixture rises to 220° C.

The trans-esterification product thus obtained is transferred to a 2nd reactor and, after heating the reaction mixture to 250° C., a vacuum of 70 mm Hg is applied in the course of ½ hour using a waterpump. The vacuum is then increased, using a vacuum pump, to 0.6 mm Hg in the course of 45 minutes, the reaction temperature being raised to 260° C. The reaction temperature and the vacuum are then maintained under these reaction conditions for 80 minutes, the reactor is then emptied and the resulting polyester, which has a relative viscosity of 2.47 is granulated.

Analysis of this polyester with the aid of nuclear magnetic resonance spectroscopy gave the following composition:

| | |
|---|---|
| terephthalic acid: | 50 mol % |
| ethylene glycol: | 27 mol % |
| diethylene glycol: | 20 mol % |
| polybutylene glycol: | 3 mol % |

The following characteristics of this polyester are measured when it is used as a hot-melt adhesive:

| | |
|---|---|
| tensile shear strength (20° C.) (N/mm$^2$): | 13.9 |
| peel strength (N/mm): | 4–7 |
| heat resistance (°C.): | 40 |
| residual tensile shear strength after storing in water for 90 days (N/mm$^2$): | 10.6 |

Tensile shear strength/temperature dependence

| T (°C.) | Tensile shear strength (N/mm$^2$) |
|---|---|
| − 60 | 14.2 |
| − 40 | 17.1 |
| − 20 | 14.4 |
| 0 | 16.2 |
| 20 | 13.9 |
| 40 | 7.7 |
| 60 | 3.9 |
| 80 | 4.3 |
| 100 | 1.9 |
| 120 | 1.1 |

| Resistance to tropical conditions/time | Tensile shear strength (N/mm$^2$) |
|---|---|
| 0 days | 13.9 |
| 10 days | 15.0 |
| 30 days | 15.7 |

| Resistance to ageing at 80° C. Time | Tensile shear strength (N/mm$^2$) |
|---|---|
| 0 days | 13.9 |
| 10 days | 13.1 |
| 30 days | 12.6 |
| 60 days | 10.6 |

EXAMPLE 2

21.6 g of dimethyl azelate, 174.6 g of dimethyl terephthalate (DMT), 124 g of ethylene glycol, 84.8 g of diethylene glycol, 39 g of polybutylene glycol with a molecular weight of 650 and also 0.132 g of zinc acetate dihydrate and 0.141 g of antimony trioxide are filled into a 2 l reactor provided with a stirrer, a nitrogen inlet and a distillation column, and the mixture is heated to 200° C. 98% of the amount of methanol theoretically to be expected is distilled off in the course of 3 hours, with stirring and whilst passing nitrogen into the mixture.

After heating the reaction mixture to 250° C., a vacuum of 70 mm Hg is applied in the course of ½ hour using a waterpump. The vacuum is then increased, using a vacuum pump, to 0.2 mm Hg in the course of 15 minutes, the reaction temperature being raised to 270° C. The reaction temperature and the vacuum are then maintained under these reaction conditions for 60 minutes, the reactor is then emptied and the resulting polyester, which has a relative viscosity of 2.33, is granulated.

Analysis of this polyester with the aid of nuclear magnetic resonance spectroscopy gave the following composition:

| | |
|---|---|
| azelaic acid: | 5.0 mol % |
| terephthalic acid: | 45.0 mol % |
| ethylene glycol: | 27.5 mol % |
| diethylene glycol: | 20.0 mol % |
| polybutylene glycol: | 2.5 mol % |

The following characteristics of this polyester are measured when it is used as a hot-melt adhesive:

| Tensile shear strength (N/mm$^2$): | |
|---|---|
| DIN 53,283 (room temperature) | 8.5 |
| after storing in water for 30 days: | |
| at 23° C. | 7.6 |
| after ageing for 10 days at 80° C.: | 10.7 |
| after ageing for 30 days at 80° C.: | 10.6 |
| peel strength (N/mm): | |
| DTA 5,577 (room temperature) | 5–8 |

EXAMPLE 3

20 g of dimethyl cyclohexanedicarboxylate (mixture of isomers), 174.6 g of dimethyl terephthalate (DMT), 62 g of ethylene glycol, 106 g of diethylene glycol, 26 g of polybutylene glycol with a molecular weight of 650 and also 0.131 g of zinc acetate dihydrate of 0.140 g of antimony trioxide are filled into a 2 l reactor provided with a stirrer, a nitrogen inlet and a distillation column, and the mixture is heated to 200° C. 97% of the amount of methanol theoretically to be expected is distilled off in the course of 2.5 hours, with stirring and whilst passing nitrogen into the mixture.

After heating the reaction mixture of 250° C., a vacuum of 70 mm Hg is applied in the course of ½ hour using a waterpump. The vacuum is then increased, using a vacuum pump, to 0.4 mm Hg in the course of 15 minutes, the reaction temperature being raised to 270° C. The reaction temperature and the vacuum are then maintained under these reaction conditions for 3 hours, the reactor is then emptied and a polyester with a relative viscosity of 1.83 is obtained.

Analysis of this polyester with the aid of nuclear magnetic resonance spectrosocpy gave the following composition:

| | |
|---|---|
| cyclohexanedicarboxylic acid: | 5.0 mol % |
| terephthalic acid: | 45.0 mol % |
| ethylene glycol: | 19.0 mol % |
| diethylene glycol: | 30.5 mol % |
| polybutylene glycol: | 0.5 mol % |

The following characteristics of this polyester are measured when its is used as a hot-melt adhesive:

| | |
|---|---|
| tensile shear strength (N/mm$^2$): | 12.9 |
| DIN 53,283 (room temperature) | 12.9 |
| after storing in water for 30 days: at 23° C. | 8.7 |
| after ageing for 10 days at 80° C.: | 11.6 |
| after ageing for 30 days at 80° C.: | 11.8 |
| peel strength (N/mm): | 2–3 |
| DTA 5,577 (room temperature) | |

EXAMPLE 4

186.2 g of dimethyl terephthalate (DMT), 124 g of ethylene glycol, 95.4 g of diethylene glycol, 39 g of polybutylene glycol with a molecular weight of 650 and also 0.14 g of zinc acetate dihydrate and 0.149 g of antimony trioxide are filled into a 2 l reactor provided with a stirrer, a nitrogen inlet and a distillation column, and the mixture is heated to 200° C. 98% of the amount of methanol theoretically to be expected is distilled off in the course of 3 hours, with stirring and whilst passing nitrogen into the mixture. After adding 22.6 g of Empol 1010 (dimeric acid from Unilever-Emery) and after heating the reaction mixture to 250° C., a vacuum of 70 mm Hg is applied in the course of ½ hour using a waterpump. The vacuum is then increased, using a vacuum pump, to 0.4 mm Hg in the course of 15 minutes, the reaction temperature being raised to 270° C. The reaction temperature and the vacuum are then maintained under these reaction conditions for 90 minutes, the reactor is then emptied and a polyester with a relative viscosity of 2.40 is obtained.

Analysis of this polyester with the aid of nuclear magnetic resonance spectroscopy gave the following composition:

| | |
|---|---|
| dimeric acid: | 2.0 mol % |
| terephthalic acid: | 48.0 mol % |
| ethylene glycol: | 25.0 mol % |
| diethylene glycol: | 22.5 mol % |
| polybutylene glycol: | 2.5 mol % | polybutylene glycol:

The following characteristics of this polyester are measured when it is used as a hot-melt adhesive:

| | |
|---|---|
| tensile shear strength (N/mm$^2$): | |
| DIN 53,283 (room temperature) | 9.5 |
| after storing in water for 30 days: at 23° C. | 8.6 |
| after ageing for 10 days at 80° C.: | 11.1 |
| after ageing for 30 days at 80° C.: | 11.4 |
| peel strength (N/mm): | 4–8 |
| DTA 5,577 (room temperature) | |

EXAMPLE 5

49.5 g of "amidodicarboxylic acid ester"=N,N-bis-(4-carbomethoxybenzoyl)-isophoronediamine, 174.6 g of dimethyl terephthalate (DMT), 49.6 g of ethylene glycol, 127.2 g of diethylene glycol, 52 g of polybutylene glycol with a molecular weight of 650 and also 0.15 g of zinc acetate dihydrate and 0.161 g of antimony trioxide are filled into a 2 l reactor provided with a stirrer, a nitrogen inlet and distillation column, and the mixture is heated to 200° C. 98% of the amount of methanol theoretically to be expected is distilled off in the course of 2.75 hours, with stirring and whilst passing nitrogen into the mixture.

After heating the reaction mixture to 250° C., a vacuum of 70 mm Hg is applied in the course of ½ hour using a waterpump. The vacuum is then increased, using a vacuum pump, to 0.3 mm Hg in the course of 15 minutes, the reaction temperature being raised to 270° C. The reaction temperature and the vacuum are then maintained under these reaction conditions for 2.5 hours, the reactor is then emptied and a polyester with a relative viscosity of 1.83 is obtained.

Analysis of this polyester with the aid of nuclear magnetic resonance spectroscopy gave the following compositon:

| | |
|---|---|
| "amidodicarboxylic acid": | 5.0 mol % |
| terephthalic acid: | 45.0 mol % |
| ethylene glycol: | 25.0 mol % |
| diethylene glycol: | 22.5 mol % |
| polybutylene glycol: | 2.5 mol % |

The following characteristics of this polyester are measured when it is used as a hot-melt adhesive:

| | |
|---|---|
| tensile shear strength (N/mm$^2$): | |
| DIN 53,283 (room temperature) | 11.8 |
| after storing in water for 30 days: at 23° C. | 7.3 |
| after ageing for 10 days at 80° C.: | 10.0 |
| after ageing for 30 days at 80° C.: | 8.8 |
| peel strength (N/mm): | 2–4.5 |
| DTA 5,577 (room temperature) | |

EXAMPLE 6

57.5 g of "triazinedicarboxylic acid"=2-diphenylamino-4,6-bis-(p-carbethoxyanilino)-s-triazine, 174.6 g of dimethyl terephthalate (DMT), 55.8 g of ethylene glycol, 106 g diethylene glycol, 65 g of polybutylene glycol with a molecular weight of 650 and also 0.156 g of zinc acetate dihydrate and 0.167 g of antimony trioxide are filled into a 2 l reactor provided with a stirrer, a nitrogen inlet and a distillation column, and and mixture is heated to 200° C. 98% of the amount of methanol theoretically to be expected is distilled off in the course of 2.5 hours, with stirring and whilst passing nitrogen into the mixture.

After heating the reaction mixture of 250° C., a vacuum of 70 mm Hg is applied in the course of ½ hour using a waterpump. The vacuum is then increased, using a vacuum pump, to 0.4 mm Hg in the course of 45 minutes, the reaction temperature being raised to 270° C. The reaction temperature and the vacuum are then maintained under these reaction conditions for 4 hours, the reactor is then emptied and a polyester with a relative viscosity of 1.53 is obtained.

Analysis of this polyester with the aid of nuclear magnetic resonance spectroscopy gave the following composition:

| | |
|---|---|
| "triazinedicarboxylic acid": | 5.0 mol % |
| terephthalic acid: | 45.0 mol % |
| ethylene glycol: | 15.5 mol % |
| diethylene glycol: | 30.0 mol % |
| polybutylene glycol: | 4.5 mol % |

The following characteristics of this polyester are measured when it is used as a hot-melt adhesive:

| | |
|---|---|
| tensile shear strength (N/mm$^2$): | |
| DIN 53,283 (room temperature) | 13.2 |
| after storing in water for 30 days: at 23° C. | 10.2 |
| after ageing for 10 days at 80° C.: | 10.2 |
| after ageing for 30 days at 80° C.: | 11.8 |
| peel strength (N/mm): DTA 5,577 (room temperature) | 2-3 |

What is claimed is:

1. A thermoplastic copolyester which has a minimum relative viscosity of 1.4, measured at 30° C. on a solution of 1 g of polyester in 100 ml of a solvent consisting of equal parts of phenol and symmetrical tetrachloroethane, and contains condensed units of at least one aromatic dicarboxylic acid and also of a mixture of aliphatic diols and which contains, based on the polyester, (a) 40–50 mol % of units of terephthalic acid, (b) 0–10 mol % of units of aliphatic, cycloaliphatic or other aromatic dicarboxylic acids, (c) 15–30 mol % of units of ethylene glycol, (d) 34.5–15 mol % of units of diethylene glycol and (e) 0.5–5 mol % of units of polybutylene glycol with a molecular weight of 650 or the same amount by weight with a molecular weight of between 400 and 4,000, it being possible for up to 10 mol % of the units of ethylene glycol and/or diethylene glycol to be replaced by units of alkylenediols having 3 to 10 C atoms and/or units of a bisphenol dihydroxyalkyl ether.

2. A copolyester according to claim 1, which has a minimum relative viscosity of 2.0, and which has a maximum relative viscosity of 5.0.

3. A copolyester according to claim 1, which contains at least 45 mol % of units of terephthalic acid.

4. A copolyester according to claim 1, wherein up to 5 mol % of the units of ethylene glycol and/or diethylene glycol have been replaced by units of alkylenediols and/or of a bisphenol dihydroxyalkyl ether.

5. A copolyester according to claim 1, which contains (c) 25–28 mol % of units of ethylene glycol, (d) 22–19 mol % of units of diethylene glycol and (e) 3 mol % of units of polybutylene glycol with a molecular weight of 650 of the same amount by weight with a molecular weight between 400 and 4,000.

6. A copolyester according to claim 1, wherein the dicarboxylic acids of component (b) as aliphatic dicarboxylic acids have 4–36 C atoms, as cycloaliphatic dicarboxylic acids have 6 to 12 C atoms and as aromatic dicarboxylic acids have 8 to 14 C atoms.

7. A copolyester according to claim 1, wherein the bisphenol dihydroxyalkyl ether is 2,2-bis-[4'-($\beta$-hydroxyethoxy)-phenyl]-propane or 1,1-bis-[4'-($\beta$-hydroxyethoxy)-phenyl]-cyclohexane.

8. A copolyester according to claim 1, which has a minimum viscosity of 2.0 and contains (c) 20–30 mol % of units of ethylene glycol, (d) 28–15 mol % of units of diethylene glycol and (e) 0.5–5 mol % of units of polybutylene glycol with a molecular weight of 650 or the same amount by weight with a molecular weight between 400 and 4,000.

9. A copolyester according to claim 2 which has a minimum relative viscosity of 2.4 and a maximum relative viscosity of 4.0.

10. A copolyester according to claim 3 which contains 50 mol % of units of terephthalic acid.

11. A hot-melt adhesive comprising a copolyester according to claim 1.

* * * * *